Sept. 21, 1926.

J. F. ROBERTS

PEACH PITTER AND CUTTER

Filed Oct. 1, 1925

1,600,567

INVENTOR
John F. Roberts
BY
ATTORNEY

Patented Sept. 21, 1926.

1,600,567

UNITED STATES PATENT OFFICE.

JOHN F. ROBERTS, OF STOCKTON, CALIFORNIA.

PEACH PITTER AND CUTTER.

Application filed October 1, 1925. Serial No. 59,779.

This invention relates to improvements in machines for cutting and pitting fruit, especially peaches, and particularly represents an improvement over the structure shown in my Patent No. 1,524,886, dated February 3rd, 1925.

The principal object of the present invention is to provide a structure whose moving parts having a simpler and more compact form of drive, one which is more efficient in operation, and one in which the parts are so arranged that the stones or pits are positively removed from the cut halves of the fruit and carried away without possibly becoming mixed with said halves.

A further object of the invention is to produce a simple and inexpensive device and yet one which will be exceedingly effective for the purpose for which it is designed.
These objects I accomplish by means of such structure and relative arrangement of parts as will fully appear by a perusal of the following specification and claims.

In the drawings similar characters of reference indicate corresponding parts in the several views.

Referring now more particularly to the characters of reference on the drawings, the numeral 1 denotes vertical side frames, 2 longitudinally spaced transverse frames, and 3 a front end transverse frame higher than the frames 2.

Figure 1:
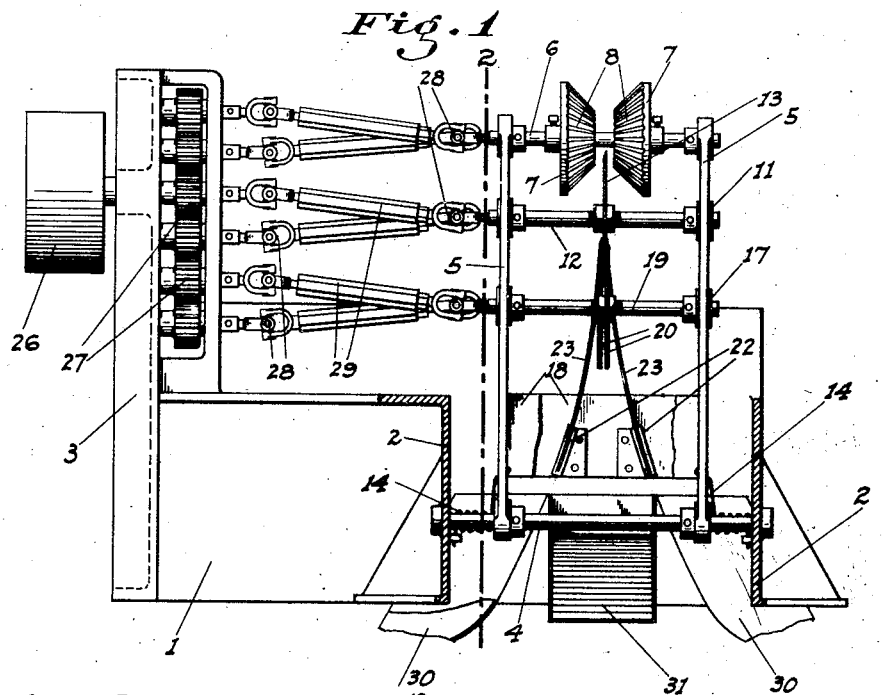
Fig. 1 is a side elevation of the device, the adjacent side frame being cut away.
Figure 2:
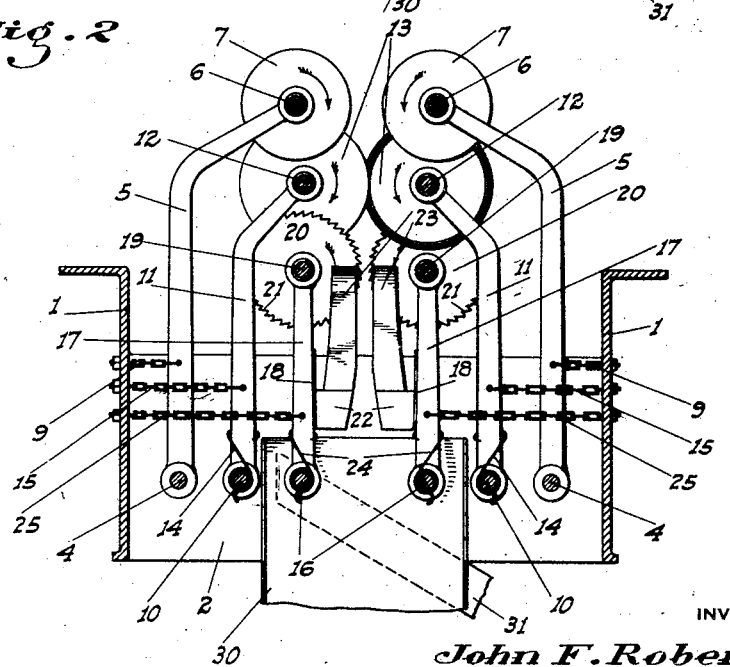
Fig. 2 is a cross section on line 2—2 of Fig. 1.

Mounted in and extending between frames 2 is a pair of transversely spaced and horizontally alined shafts 4. On each shaft is mounted a longitudinally spaced pair of vertical arms 5, the upper ends of each pair being bent to approach each other, as shown in Fig. 2. Journaled in the upper ends of the arms 5 are shafts 6 on each of which is fixed feed elements comprising a pair of oppositely disposed frusto-conical members 7, preferably of rubber, having ribs or corrugations on their tapered faces as shown at 8. Each pair of members is arranged for independent slidable adjustment on its shaft, in any suitable manner, but are always maintained in spaced relation to each other.

Owing to the shape of the arms, with the elements 7 mounted at the upper and overhanging ends thereof, said arms and elements naturally tend to approach each other by the force of the gravity. Such tendency is limited and controlled by adjustable and flexible elements such as chains 9 attached at one end to the arms and adjustably secured at their other ends to the adjacent frames 1.

Fixed in the frames 2 and extending therebetween in transversely spaced relation inwardly of the shafts 4 and parallel thereto is a pair of shafts 10. Projecting upwardly from and turnable on each of said shafts is a longitudinally spaced pair of vertical arms 11, in the upper ends of both pairs of which, below the upper ends of the arms 5 and the shafts therein, are journaled shafts 12.

Fixed on these shafts are cooperating cutting discs 13, disposed centrally of the plane of separation of each pair of elements 7.

The arms 11 are normally forced toward each other by springs 14, the action of the springs in this direction being limited and controlled by chains or similar flexible members 15 connected at one end to said arms and adjustably secured at their other ends to the adjacent frames 1.

Fixed in the frames 2 and extending therebetween inwardly of the shafts 10 is a pair of transversely spaced shafts 16, on each of which is turnable a pair of longitudinally spaced and vertical arms 17, connected a certain distance above the shaft by a plate 18. On the upper ends of each pair of these arms, below the upper ends of arms 11 and the shafts 12 therein, is turnably mounted a shaft 19. On the two shafts 19 are pit or stone engaging and ejecting discs 20, and whose peripheries are preferably of saw-toothed form, as shown at 21.

Projecting toward each other from the plates 18, a certain distance on each side of the plane of the discs 20, are slotted brackets 22 on which are removably fitted spring spreader-strips 23 which project upwardly toward and bear against the corresponding discs 20 with a concave curvature, and terminate in a horizontal plane near the horizontal center of said discs.

The arms 17 are normally forced toward each other by springs 24, this action of the springs being controlled and limited by flexible elements such as chains 25 connected at one end to the arms and adjustably mounted at the other end onto the adjacent frames 1.

Mounted on the frame 3 is a drive pulley 26 or other suitable drive member, which drives a plurality of vertically disposed and intermeshed pinions 27, all the same size. There are as many of these pulleys as there are shafts 6, 12 and 19, or in other words six.

These pinions are connected to the various shafts in proper horizontal relation by independent driving structures, each of which includes a pair of spaced universal joints 28 with a splined ship-shaft structure 29 therebetween.

The various pinions are so connected to the respective shafts that shafts 6 and consequently the elements 7, turn downwardly and inwardly toward each other, and the shafts 12 and 19, and the members thereon, rotate in similar directions.

Chutes 30 project downwardly from the strips 23, while a separate chute 31 may if desired be interposed between said chutes to catch the pits dropping from the discs 20.

In operation, the pulley 26 is set in motion to drive all the shafts, and the peaches are fed by hand, one by one, between the elements 7 while said peaches are held so that the normal line of cleavage of the fruit is in vertical alinement with the plane of the cutting discs. A peach being merely placed on the elements 7, the rotation of the latter moves the peach downwardly and into engagement with the cutters. This engagement will take place almost immediately, since said cutters extend nearly to the upper shaft 6.

With such feeding movement, the arms 5 spread apart to enable the peach to pass between the feeding members without pinching the fruit. The cutting discs 13, upon engaging the fruit, cut through the same to the pit, while at the same time the fruit moves downwardly, both by reason of its own weight and by reason of the downward force exerted thereon by the cutters, until the pit or stone is engaged by the discs 20. While the discs 13 are thus cutting the fruit, they spread apart of themselves the distance necessary to clear the pit.

When the discs 20 engage the pit, the teeth 21 thereon grip the pit and draw the same downwardly, causing the cut halves to be moved into engagement with the spreader strips—a movement which not only separates the halves from the pit but causes said halves to be positively delivered to the chutes underneath.

With the pit-engaging action of the discs 20, the latter spread to enable the pit to pass therebetween and be deposited in the chute below.

The strips 23 of course spread also, since they are attached in connection with the arms 17 on which said discs 20 are mounted.

The spreading action of all the fruit engaging members independently of each other, is of course made possible by reason of the yieldable mounting of the various arms and the flexible drive connection to each shaft.

It is to be understood that this machine is only suitable for pitting freestone peaches. I may also use it however for cutting clingstone peaches about their pits, in which case I remove the spreader strips and allow the fruit to drop directly beneath the discs 20, to be further handled to remove the pits.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:—

1. A peach cutter and pitter including a pair of cooperating cutting members, feeding members above the cutting members, pit engaging members below said cutting members, and means supporting all said members to allow them to spread apart independently of each other.

2. A peach cutter and pitter including a pair of cooperating cutting members, feeding members above the cutting members, pit engaging members below said cutting members, means supporting all said members to allow them to spread apart independently of each other, and means normally causing said members to approach each other.

3. A peach cutter and pitter including a pair of cooperating cutting members, feeding members above the cutting members, pit engaging members below said cutting members, means supporting all said members to allow them to spread apart independently of each other, and means for driving all said members from a common element without interfering with their spreading movement.

4. A peach cutter and pitter including a pair of cooperating cutting discs, and feeding means above said discs; said feeding means comprising two transversely spaced pairs of oppositely disposed frusto-conical members.

5. A peach cutter and pitter including a pair of cooperating cutting discs, and a pair of pit engaging discs mounted therebelow, the peripheries of the pit engaging discs having a toothed outline.

6. A peach cutter and pitter including a pair of cooperating cutting discs, a pair of pit engaging discs mounted therebelow, arms independent of each other supporting the cutting and pit engaging discs, means acting on the arms to force the respective discs toward each other, and adjustable means for limiting and controlling said other means.

7. A peach cutter and pitter including a pair of cooperating cutting discs, a pair of pit engaging discs mounted therebelow, and spreader-strips mounted on both sides of the last named discs and depending therefrom in diverging relation thereto.

8. A peach cutter and pitter including a pair of cooperating cutting discs, a pair of pit engaging discs mounted therebelow, spreader-strips mounted on both sides of the last named discs and depending therefrom in diverging relation thereto, said strips being mounted in fixed relation with the pit-engaging discs, and means supporting said last named discs and strips in a manner to enable the discs, and the respective strips, to spread apart from each other when a pit passes between the discs.

9. A fruit cutter and pitter including a pair of cooperating cutting members, pit engaging members disposed to engage the pit of the fruit after the latter has been acted on by the cutting members, and means supporting said members to allow them to spread apart independently of each other.

10. A fruit cutter and pitter including a pair of opposed and cooperating cutting discs, and a pair of opposed and cooperating pit engaging discs mounted relative to the cutting discs to engage the pit after the fruit has been acted on by said cutting discs.

In testimony whereof I affix my signature.

JOHN F. ROBERTS.